United States Patent
Tang

(10) Patent No.: US 10,115,014 B2
(45) Date of Patent: Oct. 30, 2018

(54) EYEPRINT RECOGNITION-BASED MOBILE TERMINAL CAMERA SELF-ADAPTATION ADJUSTMENT METHOD AND SYSTEM

(71) Applicant: JRD COMMUNICATION INC., Shenzhen (CN)

(72) Inventor: Xiangdong Tang, Shenzhen (CN)

(73) Assignee: JRD COMMUNICATION INC., Shenzhen (CN)

( * ) Notice: Subject to any disclaimer, the term of this patent is extended or adjusted under 35 U.S.C. 154(b) by 134 days.

(21) Appl. No.: 15/109,210

(22) PCT Filed: Nov. 10, 2015

(86) PCT No.: PCT/CN2015/094238
§ 371 (c)(1),
(2) Date: Jun. 30, 2016

(87) PCT Pub. No.: WO2016/176977
PCT Pub. Date: Nov. 10, 2016

(65) Prior Publication Data
US 2017/0147878 A1    May 25, 2017

(30) Foreign Application Priority Data

May 6, 2015  (CN) .......................... 2015 1 0225717

(51) Int. Cl.
*G06K 9/00* (2006.01)
*G06K 9/22* (2006.01)
(Continued)

(52) U.S. Cl.
CPC ..... *G06K 9/00604* (2013.01); *G06K 9/00617* (2013.01); *G06K 9/22* (2013.01); *G06K 9/78* (2013.01); *H04M 1/67* (2013.01); *H04N 5/2351* (2013.01); *H04N 5/2352* (2013.01); *H04N 5/23293* (2013.01); *H04N 5/23241* (2013.01)

(58) Field of Classification Search
None
See application file for complete search history.

(56) References Cited

U.S. PATENT DOCUMENTS

2011/0041102 A1    2/2011  Kim

FOREIGN PATENT DOCUMENTS

| CN | 103218142 A | 7/2013 |
|---|---|---|
| CN | 104869322 A | 8/2015 |
| CN | 1525228 A | 9/2015 |

OTHER PUBLICATIONS https://developer.android.com/guide/topics/media/camera.html, Feb. 2015.*

* cited by examiner

*Primary Examiner* — Randolph I Chu
(74) *Attorney, Agent, or Firm* — Shimokaji IP

(57) ABSTRACT

An eyeprint recognition-based mobile terminal camera self-adaptation adjustment method and system may include detecting in real time whether or not eyeprint recognition software in the mobile terminal uses a camera; acquiring a light brightness value of a current environment and calculating a current exposure initial value according to the light brightness value if the eyeprint recognition software in the mobile terminal uses the camera; and transmitting the current exposure initial value to the camera so that the camera performs self-adaptation adjustment on camera shooting configuration parameters according to the current exposure initial value.

20 Claims, 3 Drawing Sheets

(51) Int. Cl.
*G06K 9/78* (2006.01)
*H04M 1/67* (2006.01)
*H04N 5/235* (2006.01)
*H04N 5/232* (2006.01)

EYEPRINT RECOGNITION-BASED MOBILE TERMINAL CAMERA SELF-ADAPTATION ADJUSTMENT METHOD AND SYSTEM

TECHNICAL FIELD

The present invention relates to the field of mobile terminal technologies, and more particularly, to an eyeprint recognition-based mobile terminal camera self-adaptation adjustment method and system.

BACKGROUND

With the popularization of smart phones, many users may utilize lock screen software to protect their privacies on their mobile phones, beautify their mobile phones, and reduce incorrect operation. Eyeprint recognition lock screen software is lock screen software for protecting privacies on users' mobile phones. The eye texture of each person may be different and in general, may not be likely to change. The eyeprint recognition lock screen software can utilize this principle to determine whether or not a user is an owner of the mobile phone by means of eyeprint analysis.

The eyeprint recognition lock screen software can utilize a front-facing camera to acquire eye image information of the user, and then process and analyze the image data. Therefore, requirements for image quality of the front-facing camera can be relatively higher. Generally camera drivers on a platform may be unable to self-adaptively adjust an exposure initial value; instead, a constant exposure initial value may be adopted, and then can be slowly adjusted to an appropriate exposure value by means of an algorithm. If so, an image may have a process from dark to bright, and many earlier frames may be too dark to use for eyeprint recognition so that these frames may be useless and abandoned. This may waste a lot of time, causing a relatively long period of time required for unlocking, and bringing great inconvenience to users.

As can be seen, the prior art can be improved and developed.

SUMMARY

An eyeprint recognition-based mobile terminal camera self-adaptation adjustment method and system may acquire an accurate exposure initial value so that it may not need to abandon these frames during eyeprint recognition, thereby accelerating the eyeprint recognition speed and providing convenience for users.

In order to solve the technical problem, the present invention may adopt the following technical solutions:

An eyeprint recognition-based mobile terminal camera self-adaptation adjustment method may include the following steps:

S1: detecting in real time whether or not eyeprint recognition software in the mobile terminal camera uses the mobile terminal camera;

S2: if the eyeprint recognition software in the mobile terminal camera uses the mobile terminal_camera, acquiring a light brightness value of a current environment and calculating a current exposure initial value according to the light brightness value, and S3: transmitting the current exposure initial value to the mobile terminal camera, so that the mobile terminal camera performs self-adaptation adjustment on camera shooting configuration parameters according to the current exposure initial value.

In the eyeprint recognition-based mobile terminal camera self-adaptation adjustment method, Step S1 may include:

S11: turning on the mobile terminal camera by eyeprint recognition unlocking software to start preview; and S12: detecting in real time whether or not the eyeprint recognition software uses the mobile terminal camera, conducting processing according to a normal procedure of an ordinary application if the eyeprint recognition software does not use the mobile terminal camera, otherwise, going to Step S2.

In the eyeprint recognition-based mobile terminal camera self-adaptation adjustment method, Step S2 may include the following steps:

S21: starting, by a hardware abstraction layer of the mobile terminal camera, a light sensor built in the mobile terminal camera when it is detected that the eyeprint recognition software is using the mobile terminal camera;

S22: acquiring, by the light sensor, a light brightness value of a current environment, and calculating a current exposure initial value according to the light brightness value; and S23: transmitting the calculated current exposure initial value to the mobile terminal camera.

In the eyeprint recognition-based mobile terminal camera self-adaptation adjustment method, Step S3 may include the following step:

S31: receiving, by the mobile terminal camera, the current exposure initial value, and adjusting camera shooting configuration parameters in real time, wherein the camera shooting configuration parameters comprise an exposure initial index value and a gain value.

In the eyeprint recognition-based mobile terminal camera self-adaptation adjustment method, after Step S3, the following step may be further included:

S4: turning off the mobile terminal camera after the mobile terminal camera outputs an image according to the current exposure initial value and transmitting the image to the eyeprint recognition software so that the eyeprint recognition software processes the image and performs unlock.

An eyeprint recognition-based mobile terminal camera self-adaptation adjustment system, may include:

a detecting module, configured to detect in real time whether or not eyeprint recognition software in the mobile terminal camera uses the mobile terminal camera;

an exposure initial value calculating module, configured to acquire a light brightness value of a current environment and calculate a current exposure initial value according to the light brightness value if the eyeprint recognition software in the mobile terminal camera uses the mobile terminal camera;

a camera shooting parameter adjusting module, configured to transmit the current exposure initial value to the mobile terminal camera so that the mobile terminal camera performs self-adaptation adjustment on camera shooting configuration parameters according to the current exposure initial value; and a camera turning off module, configured to turn off the mobile terminal camera after the mobile terminal camera outputs an image according to the current exposure initial value and transmits the image to the eyeprint recognition software so that the eyeprint recognition software processes the image and performs unlock.

In the eyeprint recognition-based mobile terminal camera self-adaptation adjustment system, the detecting module may include:

an unlocking unit, configured to turn on the mobile terminal camera by the eyeprint recognition unlocking software to start preview; and a determining unit, configured to detect in real time whether or not the eyeprint recognition software uses the mobile terminal camera so as to conduct processing according to a normal procedure of an ordinary application if the eyeprint recognition software does not use the mobile terminal camera or otherwise to further acquire the light brightness value of the current environment.

In the eyeprint recognition-based mobile terminal camera self-adaptation adjustment system, the exposure initial value calculating module may include:

a light sensor starting unit, configured to start, by a hardware abstraction layer of the mobile terminal camera, a light sensor built in the mobile terminal camera when it is detected that the eyeprint recognition software is using the mobile terminal camera;

an exposure initial value acquiring unit, configured to acquire, by the light sensor, a light brightness value of a current environment, and calculate a current exposure initial value according to the light brightness value; and an exposure initial value transmitting unit, configured to transmit the calculated current exposure initial value to the mobile terminal camera.

In the eyeprint recognition-based mobile terminal camera self-adaptation adjustment system, the camera shooting parameter adjusting module may include:

a receiving and adjusting unit, configured to receive, by the mobile terminal camera, the current exposure initial value, and adjust camera shooting configuration parameters in real time, wherein the camera shooting configuration parameters comprise an exposure initial index value and a gain value.

The present invention may provide an eyeprint recognition-based mobile terminal camera self-adaptation adjustment method and system. The method may include: detecting in real time whether or not eyeprint recognition software in the mobile terminal uses a mobile terminal camera; acquiring a light brightness value of a current environment and calculating a current exposure initial value according to the light brightness value if the eyeprint recognition software in the mobile terminal uses the mobile terminal camera; and transmitting the current exposure initial value to the mobile terminal camera so that the mobile terminal camera performs self-adaptation adjustment on camera shooting configuration parameters according to the current exposure initial value. In the present invention, while the mobile terminal camera is started, more accurate exposure initial value may be acquired and calculated through a light sensor built in the mobile terminal camera, further, self-adaptation adjustment may be performed on the camera shooting configuration parameters according to the exposure initial value, so that users may not need to spend time discarding useless frames during eyeprint recognition. Therefore, eyeprint recognition speed may be accelerated, and great convenience in use may be brought to the users.

DETAILED DESCRIPTION OF THE EMBODIMENTS

The present invention discloses an eyeprint recognition-based mobile terminal camera self-adaptation adjustment method and system. To make the objectives, technical solutions, and advantages of the present invention clearer and more explicit, the following further describes in detail the present invention with reference to the accompanying drawings and embodiments. It is to be understood that the embodiments described herein are only intended to explain the present invention, and are not restrictive of the present invention.

Figure 1:
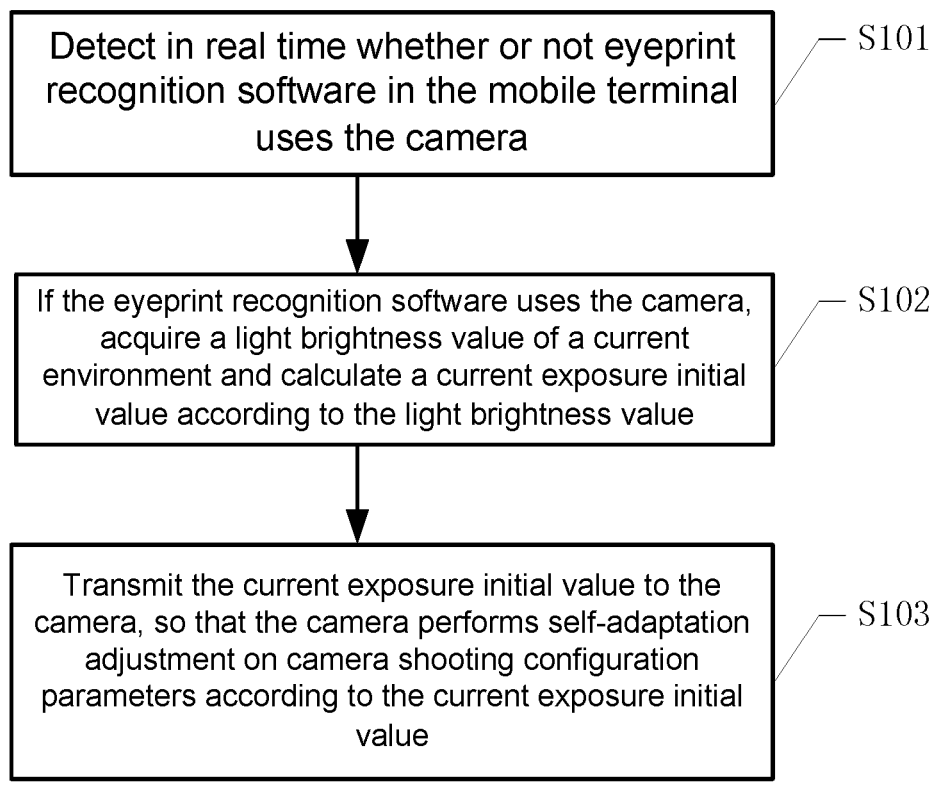
FIG. 1 is a flowchart of an eyeprint recognition-based mobile terminal camera self-adaptation adjustment method according to an embodiment of the present invention.

FIG. is a flowchart of an eyeprint recognition-based mobile terminal camera self-adaptation adjustment method according to a preferred embodiment of the present invention. The eyeprint recognition-based mobile terminal camera self-adaptation adjustment method as shown in FIG. 1 may include:

Step S101: Detect in real time whether or not eyeprint recognition software in the mobile terminal camera uses the mobile terminal camera.

Eyeprint recognition lock screen software in the present invention may be lock screen software for protecting privacies on users' mobile phones. It may determine whether or not a user is an owner of the mobile phone by means of eyeprint analysis. Its principle of use may be as below: a plurality of eye images of the user may be acquired by using the front-facing camera, then data processing may be performed on these images to acquire eyeprint information of the user, and the eyeprint information may be stored in the mobile phone locally. When the user unlocks the mobile phone, the eyeprint recognition software may turn on the front-facing camera to reacquire the eyeprint information of the user, and then it may be determined whether or not the user is the owner of the mobile phone by comparing the eyeprint recognition with the prestored eyeprint information. The use procedures may be as below: the user may input his/her own eyeprint information, which may be similar to face recognition lock screen software. Also an alternative unlock method may need to be inputted. This may be because image recognition lock screen software has a certain probability of failure in unlocking the screen. An alternative unlock method such as a password or nine-grid pattern may be preset so that the alternative unlock method is enabled once the eyeprint recognition fails.

Based on the above description, Step S101 in the embodiments of the present invention may include the following steps:

A11: Turn on the mobile terminal camera by eyeprint recognition unlocking software to start preview; and A12: Detect in real time whether or not the eyeprint recognition software uses the mobile terminal camera so as to conduct processing according to a normal procedure of an ordinary application if the eyeprint recognition software does not use the mobile terminal camera or otherwise to further acquire the light brightness value of the current environment.

Step S102: If the eyeprint recognition software uses the mobile terminal camera, acquire a light brightness value of a current environment and calculate a current exposure initial value according to the light brightness value.

In the embodiments of the present invention, Step S102 may include the following steps:

A21: Start, by a hardware abstraction layer of the mobile terminal camera, a light sensor built in the mobile terminal camera when it is detected that the eyeprint recognition software is using the mobile terminal camera;

A22: Acquire, by the light sensor, a light brightness value of a current environment, and calculate a current exposure initial value according to the light brightness value; and A23: Transmit the calculated current exposure initial value to the mobile terminal camera.

The light sensor of the mobile phone may have a light ray sensor function and its effect in the mobile phone generally may be as below: the mobile phone may adjust its screen brightness according to intensity of ambient light acquired by the light sensor, thereby playing a role in saving power and protecting eyes. For example, when you are reading an e-book in bed after lights out at night, the mobile phone may automatically adjust the screen brightness lower because the ambient environment light is very dark, which is lower in irritation to the eyes and more efficient in power saving. If you want to use the mobile phone in the sunshine, the mobile phone may maximize the screen brightness so that you can see more clearly.

The light sensor generally may be positioned at the upper edge in the front face of the mobile phone and may be adjacent to the front-facing camera. Therefore, in the present invention, the light sensor may be used to acquire the light brightness value of the current environment, and a relatively accurate exposure initial value with regard to the current environment may be calculated and acquired through the light brightness value. This initial value may be transmitted to the mobile terminal camera, and when an eyeprint recognition program starts the mobile terminal camera to start preview, the light sensor may be used to provide the exposure initial value. In this way, the problem that several earlier frames are darker may be solved, so that it may be unnecessary for the eyeprint recognition software to discard these darker frames, and the unlocking speed may be improved.

Step S103: Transmit the current exposure initial value to the mobile terminal camera so that the mobile terminal camera performs self-adaptation adjustment on camera shooting configuration parameters according to the current exposure initial value.

In the embodiments of the present invention, Step S103 may include the following step:

A31: Receive, by the mobile terminal camera, the current exposure initial value, and adjust the camera shooting configuration parameters in real time, where the camera shooting configuration parameters include an exposure initial index value and a gain value.

In practical application, an exposure meter of the camera inductor generally may be an array having more than 400 items, in which exposure setting parameters may be stored. The larger the array index is, the higher the exposure gain value may be. In a darker environment, a relatively higher gain value may be required. Instead, a lower gain value may be required in a brighter environment. Only when accurate exposure parameters are configured for the camera inductor may a clear image be acquired. Too much noise may be introduced if the gain value is too large; however, the image is too dark if the gain value is too small.

Ambient brightness for use of the mobile phone may be simply classified into three scopes: darker, normal and outdoor highly bright. The current brightness scope of the mobile phone may be determined according to a luma light brightness value acquired by the light sensor, and exposure initialization parameters may be set up according to this brightness scope. In this way, the problem that several earlier frames are too dark or too bright may be successfully solved, thereby improving the unlock speed.

Figure 2:
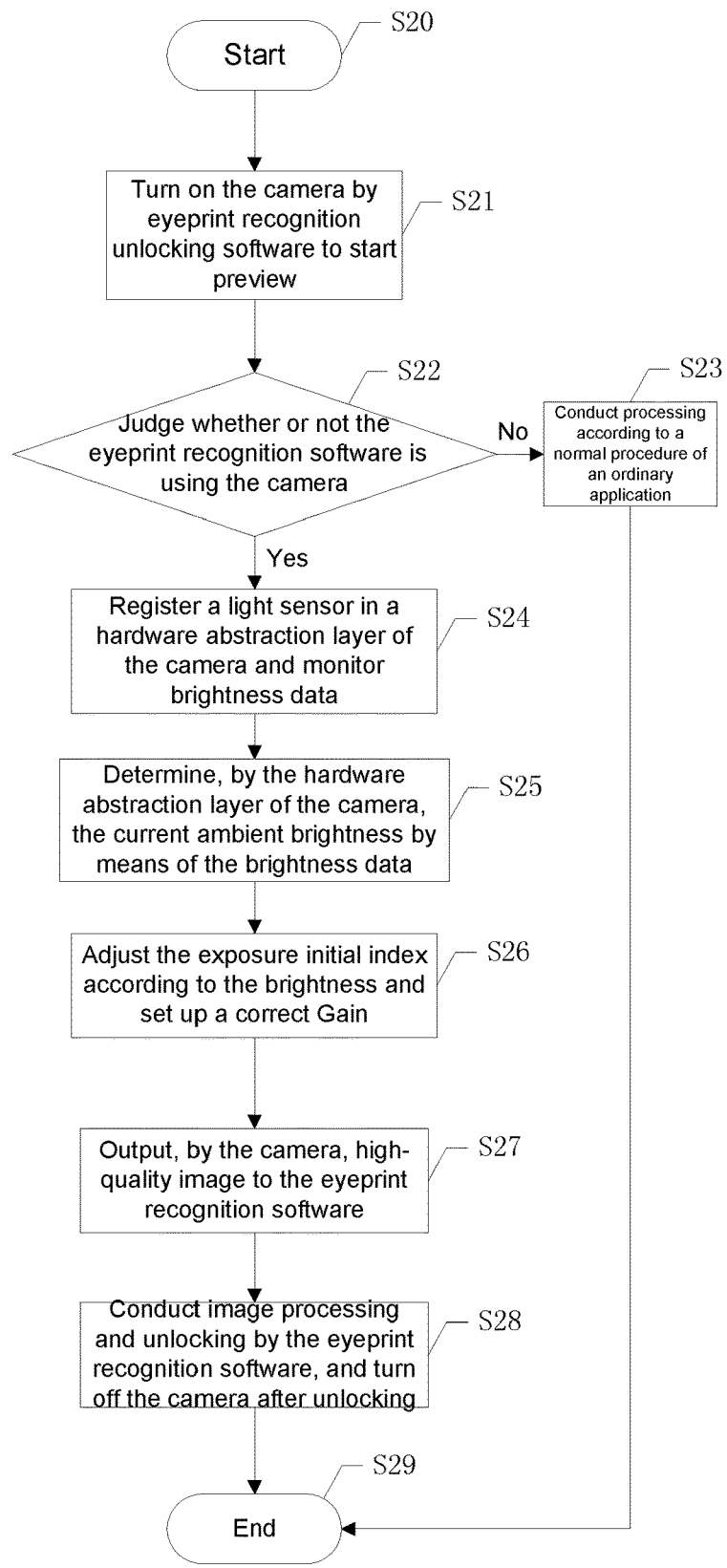
FIG. 2 is a flowchart of an eyeprint recognition-based mobile terminal camera self-adaptation adjustment method according to an embodiment of the present invention.

The following will further describe the present invention with reference to specific application embodiments. FIG. 2 is a flowchart of an eyeprint recognition-based mobile terminal camera self-adaptation adjustment method according to an embodiment of the present invention. As shown in FIG. 2, the following steps may be included:

S20: Start a program;

S21: Turn on the mobile terminal camera by eyeprint recognition unlocking software to start preview;

S22: Determine whether or not the eyeprint recognition software is using the mobile terminal camera, go to Step S23 if the eyeprint recognition software is not using the mobile terminal camera, otherwise, go to Step S24;

S23: Conduct processing according to a normal procedure of an ordinary application if the eyeprint recognition software is not using the mobile terminal camera, and go to Step S29 to end this program;

S24: When the eyeprint recognition software is using the mobile terminal camera, register a light sensor in a hardware abstraction layer of the mobile terminal camera and monitor brightness data in real time;

S25: Determine, by the hardware abstraction layer of the mobile terminal camera, the current ambient brightness by means of the brightness data;

S26: Adjust the camera exposure initial index value according to the ambient brightness and set up a correct gain value;

S27: Output, by the mobile terminal camera, high-quality image to the eyeprint recognition software;

S28: Conduct image processing and unlocking by the eyeprint recognition software; turn off the mobile terminal camera after unlocking; and S29: End this program.

As can be seen from the above, in the present invention, while the mobile terminal camera is started, more accurate exposure initial value is acquired and calculated through a light sensor built in the mobile terminal camera, further, self-adaptation adjustment may be performed on the camera shooting configuration parameters according to the exposure initial value, so that users do not need to spend time discarding useless frames during eyeprint recognition. Therefore, eyeprint recognition speed may be accelerated, and great convenience in use may be brought to the users.

Figure 3:
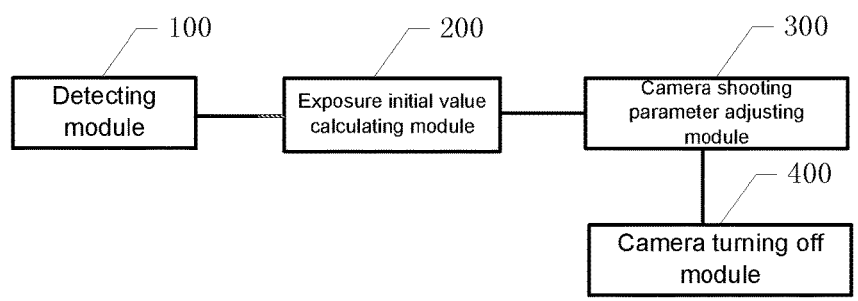
FIG. 3 is a function module diagram of an eyeprint recognition-based mobile terminal camera self-adaptation adjustment system according to an embodiment of the present invention.

Based on the foregoing embodiments, the present invention may further provide an eyeprint recognition-based mobile terminal camera self-adaptation adjustment system, as shown in FIG. 3, including:

a detecting module 100, configured to detect in real time whether or not eyeprint recognition software in the mobile terminal camera uses the mobile terminal camera, as mentioned above;

an exposure initial value calculating module 200, configured to acquire a light brightness value of a current environment and calculate a current exposure initial value according to the light brightness value if the eyeprint recognition software in the mobile terminal camera uses the mobile terminal camera, as mentioned above;

a camera shooting parameter adjusting module 300, configured to transmit the current exposure initial value to the mobile terminal camera so that the mobile terminal camera performs self-adaptation adjustment on camera shooting configuration parameters according to the current exposure initial value, as mentioned above; and a camera turning off module 400, configured to turn off the mobile terminal camera after the mobile terminal camera outputs an image according to the current exposure initial value and transmits the image to the eyeprint recognition software so that the eyeprint recognition software processes the image and performs unlock, as mentioned above.

Further, the detecting module 100 may include:

an unlocking unit, configured to turn on the mobile terminal camera by the eyeprint recognition unlocking software to start preview; and a determining unit, configured to detect in real time whether or not the eyeprint recognition software uses the mobile terminal camera so as to conduct processing according to a normal procedure of an ordinary application if the eyeprint recognition software does not use the mobile terminal camera or otherwise to further acquire the light brightness value of the current environment, as mentioned above.

Further, the exposure initial value calculating module 200 includes:

a light sensor starting unit, configured to start, by a hardware abstraction layer of the mobile terminal camera, a light sensor built in the mobile terminal camera when it is detected that the eyeprint recognition software is using the mobile terminal camera, as mentioned above;

an exposure initial value acquiring unit, configured to acquire, by the light sensor, a light brightness value of a current environment, and calculate a current exposure initial value according to the light brightness value, as mentioned above; and an exposure initial value transmitting unit, configured to transmit the calculated current exposure initial value to the mobile terminal camera, as mentioned above.

Further, the camera shooting parameter adjusting module 300 may include:

a receiving and adjusting unit, configured to receive, by the mobile terminal camera, the current exposure initial value, and adjust camera shooting configuration parameters in real time, wherein the camera shooting configuration parameters comprise: an exposure initial index value and a gain value, as mentioned above.

In conclusion, the present invention provides an eyeprint recognition-based mobile terminal camera self-adaptation adjustment method and system. The method may include: detecting in real time whether or not eyeprint recognition software in the mobile terminal uses a mobile terminal camera; acquiring a light brightness value of a current environment and calculating a current exposure initial value according to the light brightness value if the eyeprint recognition software in the mobile terminal camera uses the mobile terminal camera; and transmitting the current exposure initial value to the mobile terminal camera so that the mobile terminal camera performs self-adaptation adjustment on camera shooting configuration parameters according to the current exposure initial value. In the present invention, while the mobile terminal camera is started, more accurate exposure initial value may be acquired and calculated through a light sensor built in the mobile terminal camera, further, self-adaptation adjustment may be performed on the camera shooting configuration parameters according to the exposure initial value, so that users do not need to spend time discarding useless frames during eyeprint recognition. Therefore, eyeprint recognition speed may be accelerated, and great convenience in use may be brought to the users.

It is to be understood that application of the present invention is not limited to the foregoing examples, those of ordinary skill in the art may make improvements or transformations according to the foregoing description, and all these improvements and transformations should fall within the scope of protection of the appended claims of the present invention.

The invention claimed is:

1. An eyeprint recognition-based mobile terminal camera self-adaptation adjustment method, including:

detecting in real time whether or not eyeprint recognition software of the mobile terminal uses the mobile terminal camera;

if the eyeprint recognition software uses the mobile terminal camera, turning on the mobile terminal camera by eyeprint recognition software;

if the eyeprint recognition software does not use the mobile terminal camera, conducting processing according to a normal procedure of an ordinary application;

in response to the eyeprint recognition software using the mobile terminal camera, before starting a preview operation of the eyeprint recognition software, starting, by a hardware abstraction layer of the mobile terminal camera, a light sensor built in the mobile terminal, acquiring, by the light sensor, a light brightness value of a current environment of the mobile terminal, classifying the light brightness value into one of a plurality of brightness scopes, each brightness scope comprising a range of light brightness values, and calculating a current exposure initial value according to the one brightness scope, and transmitting the calculated current exposure initial value to the mobile terminal camera;

receiving, by the mobile terminal camera, the current exposure initial value, and adjusting camera shooting configuration parameters in real time for the preview operation, wherein the camera shooting configuration parameters comprise an exposure initial index value and a gain value; and turning off the mobile terminal camera after the mobile terminal camera outputs an image according to the current exposure initial value and transmits the image to the eyeprint recognition software so that the eyeprint recognition software processes the image and performs unlock.

2. An eyeprint recognition-based mobile terminal camera self-adaptation adjustment method, including:

detecting in real time whether or not eyeprint recognition software in the mobile terminal camera uses the mobile terminal camera to determine an eyeprint of a user of the mobile terminal;

if the eyeprint recognition software in the mobile terminal camera uses the mobile terminal camera, acquiring a light brightness value of a current environment;

determining which brightness scope, of a plurality of different brightness scopes each comprising a range of light brightness values, includes the acquired light brightness value;

deriving a current exposure initial value according to the brightness scope that includes the acquired light brightness value, and transmitting the current exposure initial value to the mobile terminal camera, so that the mobile terminal camera performs self-adaptation adjustment on the camera shooting configuration parameters according to the current exposure initial value before the eyeprint recognition software uses the mobile terminal camera in an eyeprint recognition operation that unlocks the mobile terminal.

3. The eyeprint recognition-based mobile terminal camera self-adaptation adjustment method according to claim 2, wherein the detecting in real time whether or not the eyeprint recognition software in the mobile terminal camera uses the mobile terminal camera includes:
- turning on the mobile terminal camera by eyeprint recognition unlocking software to start preview; and
- conducting processing according to a normal procedure of an ordinary application if the eyeprint recognition software does not use the mobile terminal camera.

4. The eyeprint recognition-based mobile terminal camera self-adaptation adjustment method according to claim 3, including:
- starting, by a hardware abstraction layer of the mobile terminal camera, a light sensor built in the mobile terminal camera when it is detected that the eyeprint recognition software is using the mobile terminal camera; and
- transmitting the calculated current exposure initial value to the mobile terminal camera before the eyeprint recognition unlocking software starts preview.

5. The eyeprint recognition-based mobile terminal camera self-adaptation adjustment method according to claim 4, including:
- receiving, by the camera, the current exposure initial value, and adjusting camera shooting configuration parameters in real time, wherein the mobile terminal camera shooting configuration parameters comprise an exposure initial index value and a gain value.

6. The eyeprint recognition-based mobile terminal camera self-adaptation adjustment method according to claim 5, including:
- turning off the mobile terminal camera after the mobile terminal camera outputs an image according to the current exposure initial value and transmits the image to the eyeprint recognition software so that the eyeprint recognition unlocking software processes the image and performs unlock.

7. An eyeprint recognition-based mobile terminal camera self-adaptation adjustment system, comprising:
- a detecting module, configured to detect in real time whether or not eyeprint recognition software in the mobile terminal camera uses the mobile terminal camera;
- an exposure initial value calculating module, configured to classify ambient brightness into one of a plurality of different brightness scopes, each brightness scope including a range of light brightness values, and calculate a current exposure initial value according to the one brightness scope if the eyeprint recognition software in the mobile terminal camera uses the mobile terminal camera;
- a camera shooting parameter adjusting module, configured to transmit the current exposure initial value to the mobile terminal camera so that the mobile terminal camera performs self-adaptation adjustment on camera shooting configuration parameters according to the current exposure initial value;
- a mobile terminal camera configured to acquire and output at least one initial image using the current exposure initial value and not a single, predetermined constant exposure initial value; and
- a camera turning off module, configured to turn off the mobile terminal camera after the mobile terminal camera outputs at least one image according to the current exposure initial value and after the mobile terminal camera transmits the image to the eyeprint recognition software so that the eyeprint recognition software processes the image and performs unlock.

8. The eyeprint recognition-based mobile terminal camera self-adaptation adjustment system according to claim 7, wherein the detecting module comprises:
- an unlocking unit, configured to turn on the mobile terminal camera by the eyeprint recognition unlocking software to start preview; and
- a determining unit, configured to detect in real time whether or not the eyeprint recognition software uses the mobile terminal camera so as to conduct processing according to a normal procedure of an ordinary application if the eyeprint recognition software does not use the mobile terminal camera or otherwise to further acquire the light brightness value of the current environment.

9. The eyeprint recognition-based mobile terminal camera self-adaptation adjustment system according to claim 8, wherein the exposure initial value calculating module includes:
- a light sensor starting unit, configured to start, by a hardware abstraction layer of the mobile terminal camera, a light sensor built in the mobile terminal when it is detected that the eyeprint recognition software is using the mobile terminal camera; and
- an exposure initial value transmitting unit, configured to transmit the calculated current exposure initial value to the mobile terminal camera.

10. The eyeprint recognition-based mobile terminal camera self-adaptation adjustment system according to claim 9, wherein the mobile terminal camera shooting parameter adjusting module includes:
- a receiving and adjusting unit, configured to receive, by the mobile terminal camera, the current exposure initial value, and adjust camera shooting configuration parameters in real time, wherein the camera shooting configuration parameters comprise an exposure initial index value and a gain value.

11. The method of claim 1, wherein the number of brightness scopes is at least three.

12. The method of claim 1, wherein the mobile terminal camera minimizes a brightness of a display on the mobile terminal camera in a dark environment.

13. The method of claim 12, wherein the mobile terminal camera maximizes a brightness of the display on the mobile terminal camera in a bright environment.

14. The method of claim 1, wherein the light sensor is attached to an upper edge of the mobile terminal camera.

15. The method of claim 1, wherein the current exposure initial value is transmitted to the mobile terminal camera when the eyeprint recognition software starts the mobile terminal camera to start a preview.

16. The method of claim 2, wherein the number of brightness scopes is at least three.

17. The method of claim 2, wherein the current exposure initial value is transmitted to the mobile terminal camera when the eyeprint recognition software starts the mobile terminal camera to start a preview.

18. The system of claim 7, wherein the number of brightness scopes is at least three.

19. The system of claim 7, wherein the mobile terminal camera minimizes a brightness of a display on the mobile terminal camera.

20. The system of claim 7, wherein the current exposure initial value is transmitted to the mobile terminal camera when the eyeprint recognition software starts the mobile terminal camera to start a preview.

* * * * *